Figure 1:
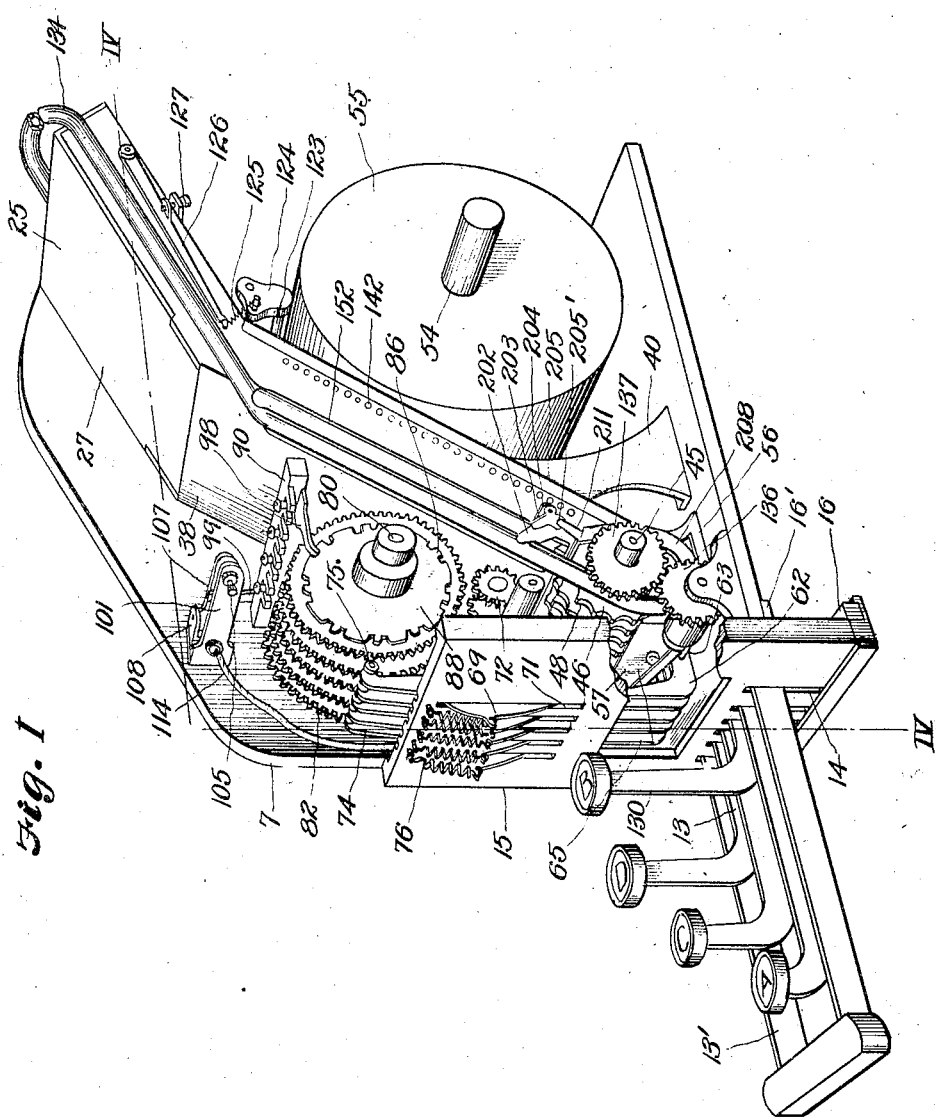

E. H. PIERSEN.
TELEGRAPH TRANSMITTER.
APPLICATION FILED MAY 28, 1918.

1,289,899.

Patented Dec. 31, 1918.
10 SHEETS—SHEET 1.

INVENTOR.
Edwin H. Piersen
BY
ATTORNEY.

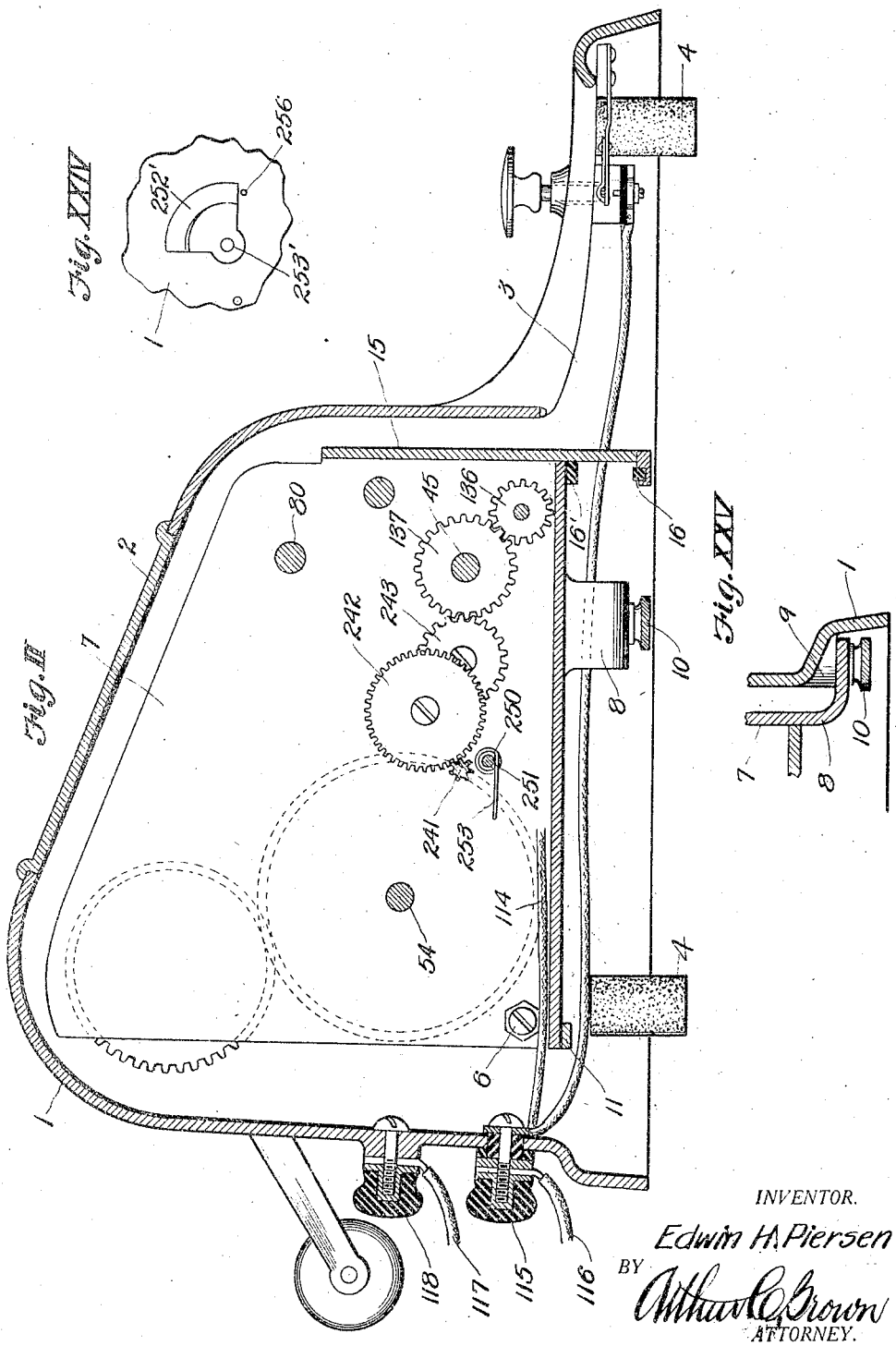

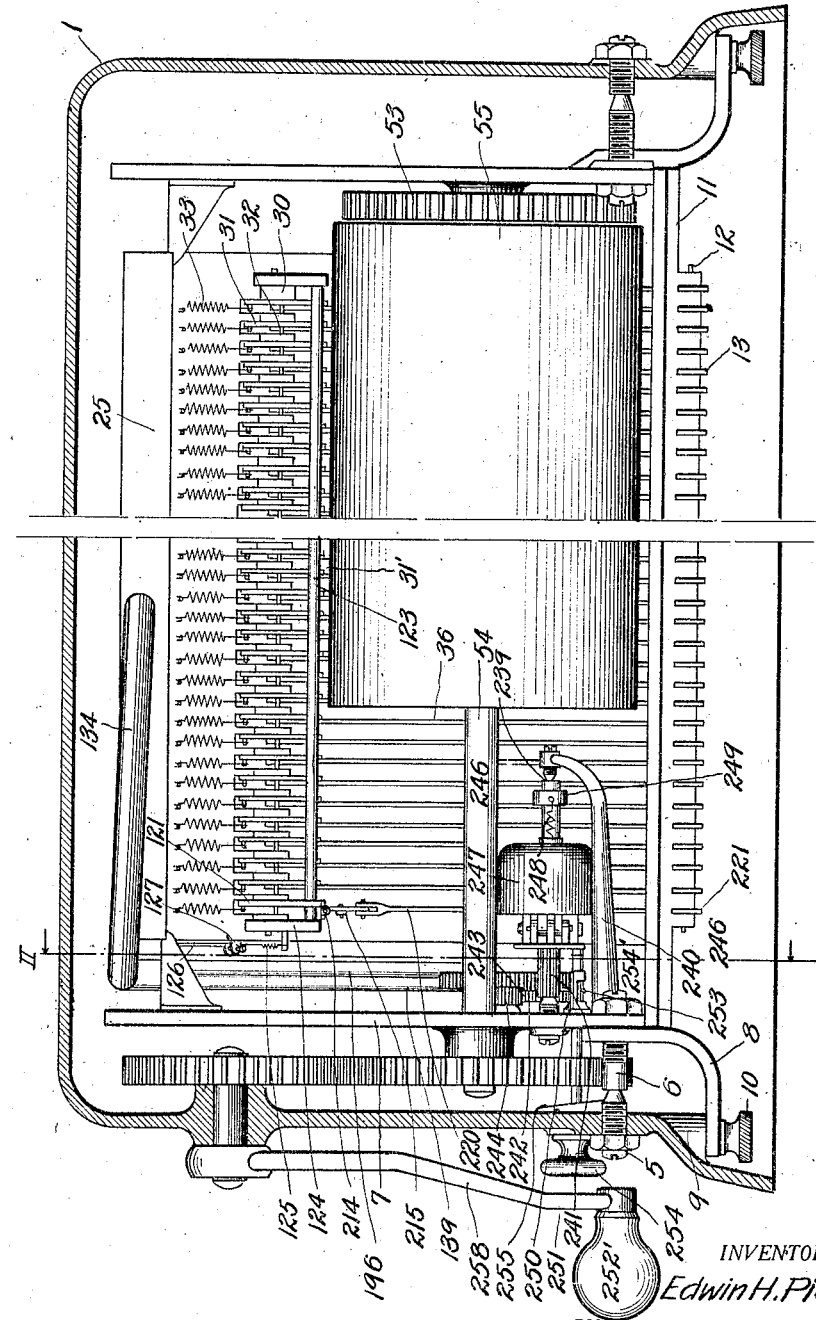

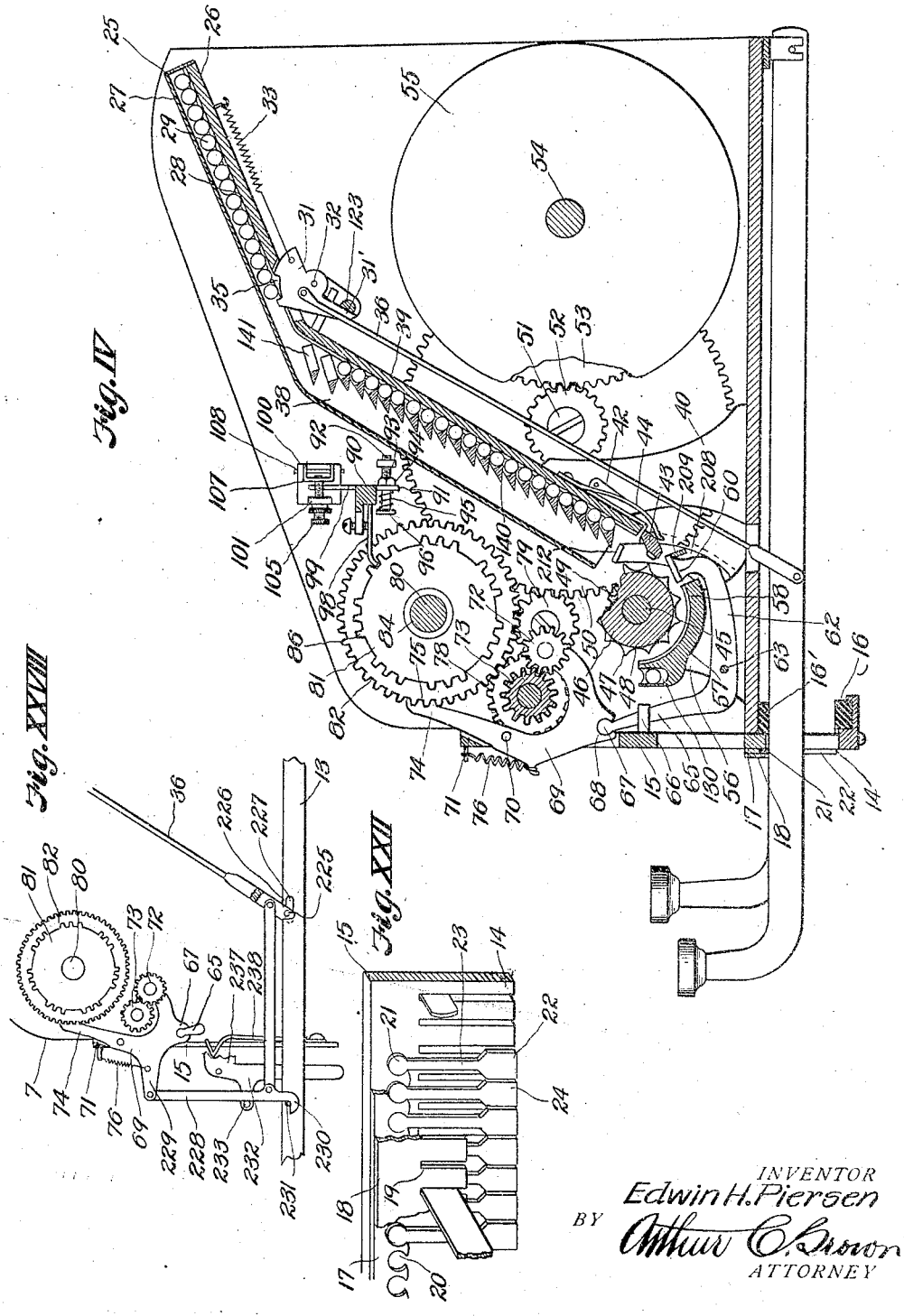

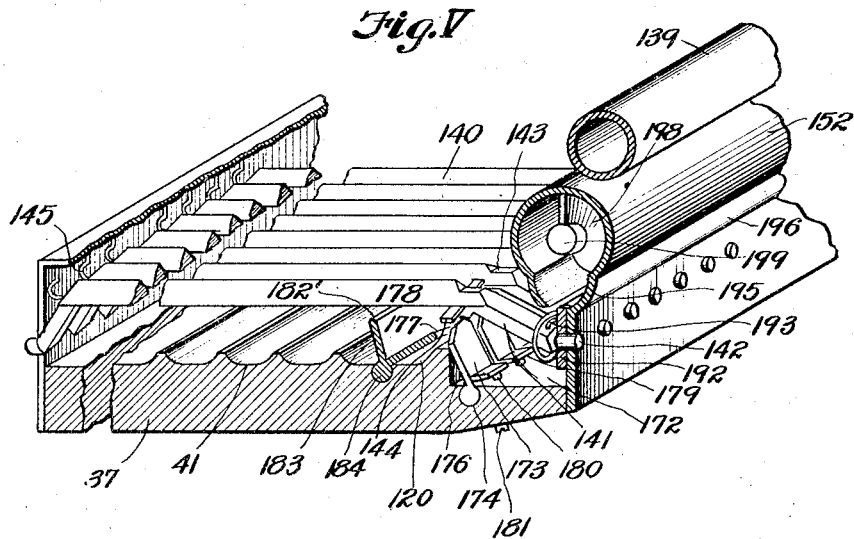
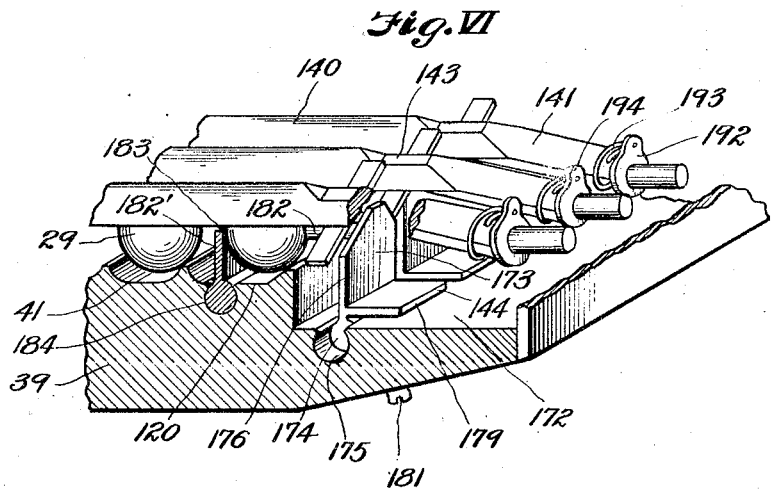

E. H. PIERSEN.
TELEGRAPH TRANSMITTER.
APPLICATION FILED MAY 28, 1918.
1,289,899.
Patented Dec. 31, 1918.
10 SHEETS—SHEET 6.
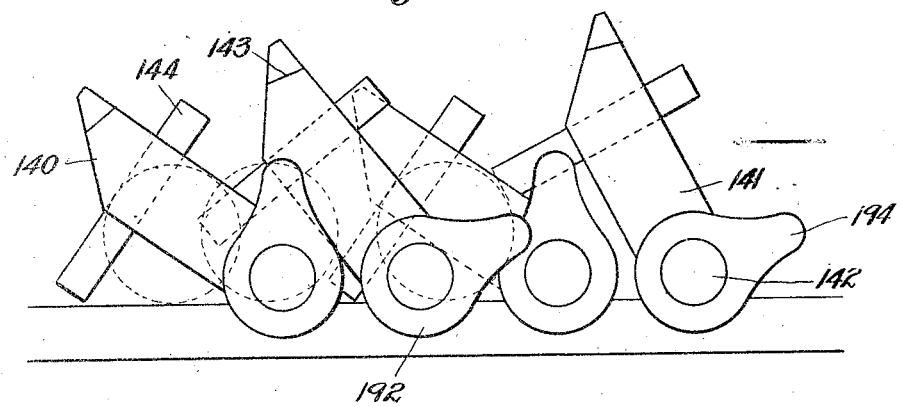
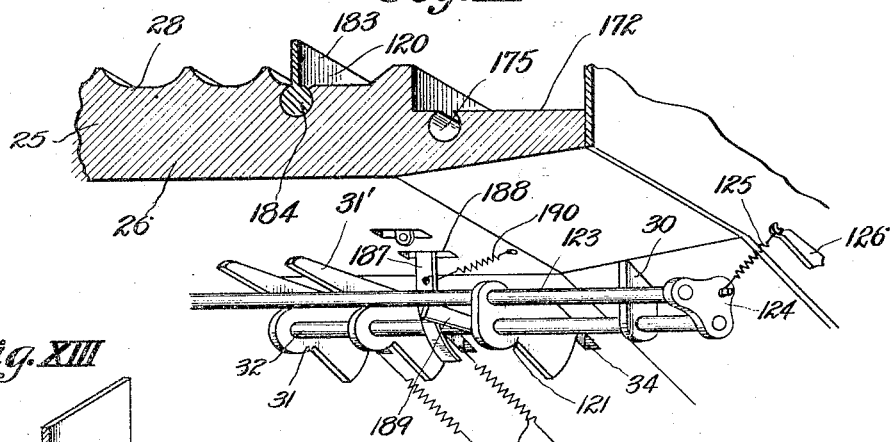
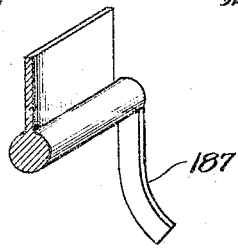
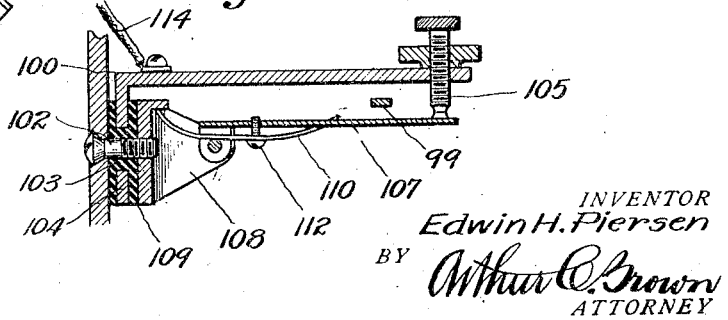
INVENTOR
Edwin H. Piersen
BY
Arthur C. Brown
ATTORNEY E. H. PIERSEN.
TELEGRAPH TRANSMITTER.
APPLICATION FILED MAY 28, 1918.
1,289,899.
Patented Dec. 31, 1918.
10 SHEETS—SHEET 7.
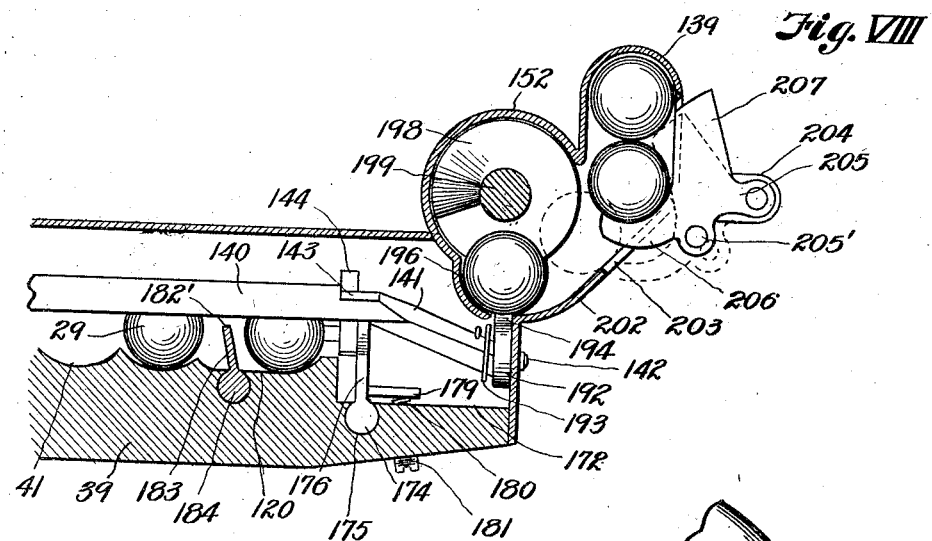
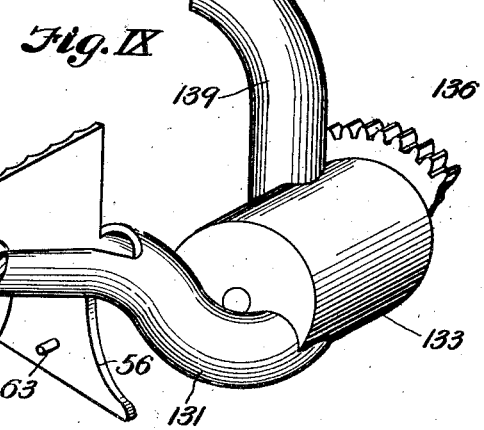
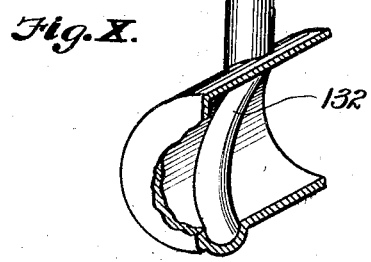
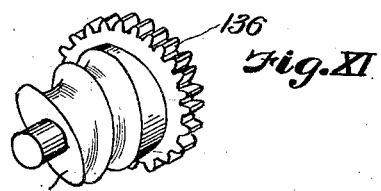
INVENTOR
Edwin H. Piersen
BY Arthur C. Brown
ATTORNEY E. H. PIERSEN.
TELEGRAPH TRANSMITTER.
APPLICATION FILED MAY 28, 1918.
1,289,899.
Patented Dec. 31, 1918.
10 SHEETS—SHEET 8.
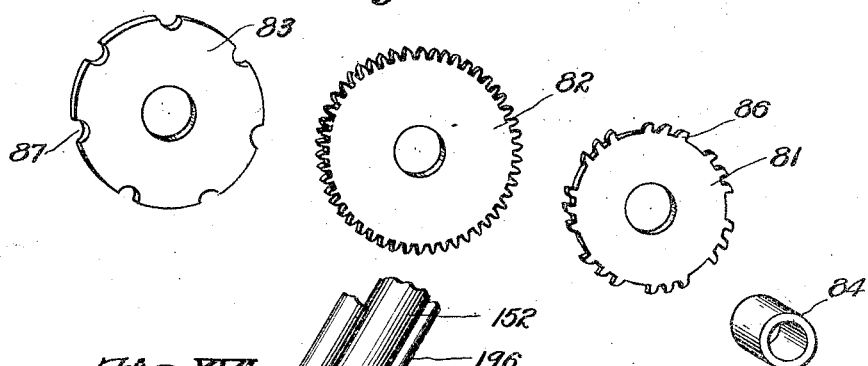
Fig. XIV
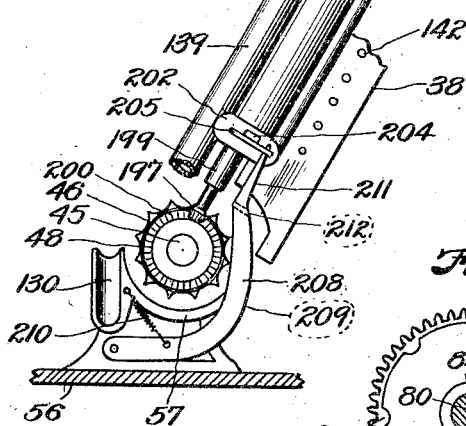
Fig. XVI
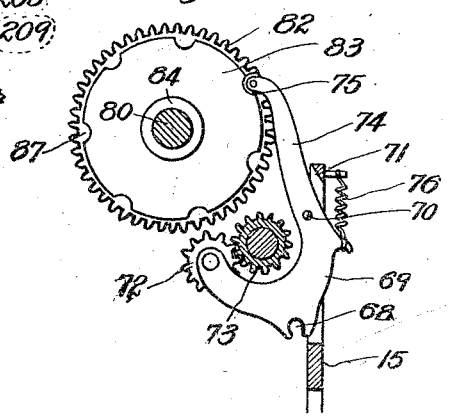
Fig. XV
INVENTOR
Edwin H. Piersen
BY Arthur C. Brown
ATTORNEY E. H. PIERSEN.
TELEGRAPH TRANSMITTER.
APPLICATION FILED MAY 28, 1918.
1,289,899.
Patented Dec. 31, 1918.
10 SHEETS—SHEET 9.
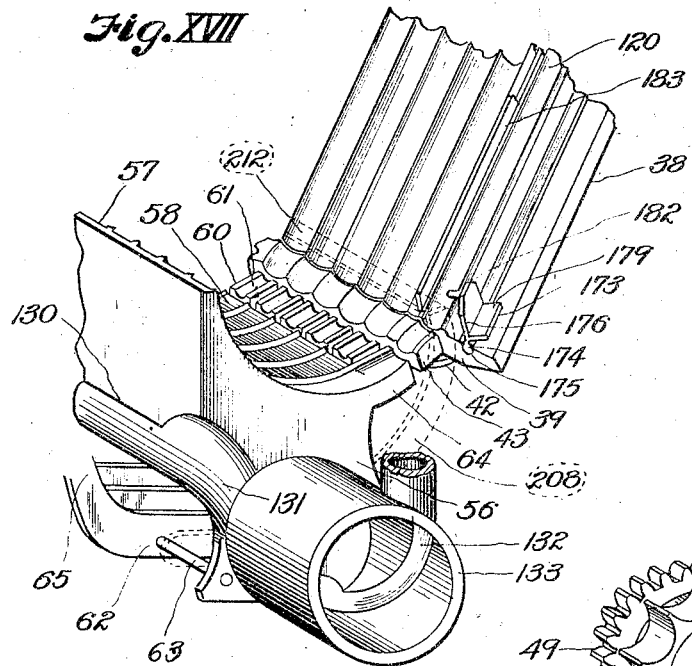
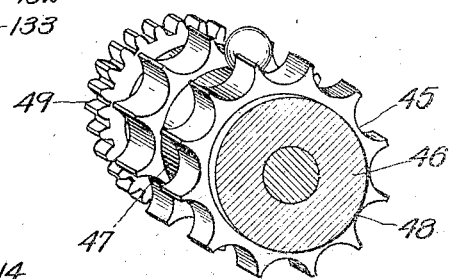
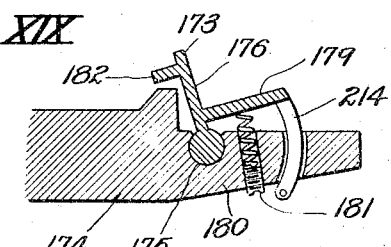
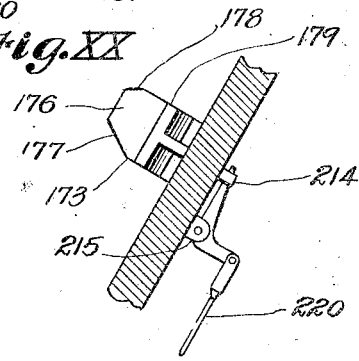
INVENTOR
Edwin H. Piersen
BY
ATTORNEY E. H. PIERSEN.
TELEGRAPH TRANSMITTER.
APPLICATION FILED MAY 28, 1918.
1,289,899.
Patented Dec. 31, 1918.
10 SHEETS—SHEET 10.
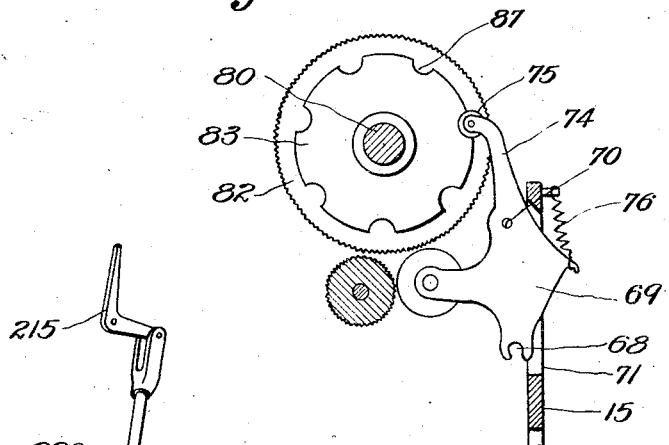
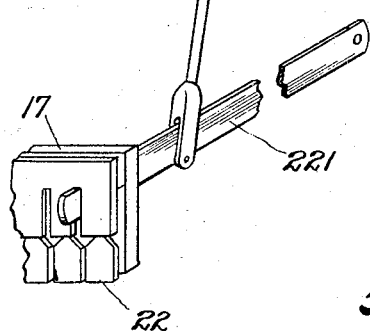
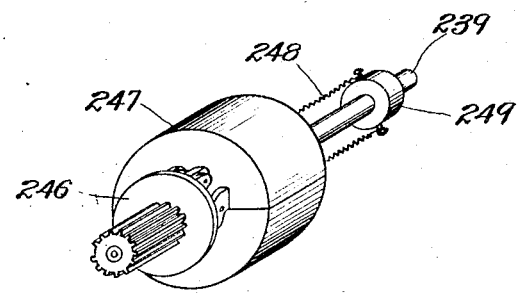
INVENTOR
Edwin H. Piersen
BY Arthur C. Brown
ATTORNEY

UNITED STATES PATENT OFFICE.

EDWIN H. PIERSEN, OF TOPEKA, KANSAS, ASSIGNOR TO THE PIERSEN TELEGRAPH TRANSMITTER COMPANY, OF TOPEKA, KANSAS, A CORPORATION OF KANSAS.

TELEGRAPH-TRANSMITTER.

1,289,899.     Specification of Letters Patent.     Patented Dec. 31, 1918.

Continuation of application Serial No. 739,295, filed December 30, 1912. This application filed May 28, 1918. Serial No. 237,133.

*To all whom it may concern:*

Be it known that I, EDWIN H. PIERSEN, a citizen of the United States, residing at Topeka, in the county of Shawnee and State of Kansas, have invented certain new and useful Improvements in Telegraph-Transmitters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This application is a continuation of an application filed by me December 30, 1912, Serial No. 739,295 for telegraph transmitters and has for its principal object to provide a key board apparatus for sending telegraphic messages, and wherein the symbol controlling members may be stored and released in proper sequence to properly transmit a message, irrespective of the speed or irregularity of operation of the keyboard.

In accomplishing this object, I have provided an apparatus comprising a plurality of individually operative character members, pilot members for setting the character members and pilot members for controlling the tumblers, together with means for releasing the tumblers and returning the parts to storage, whereby the character members may be accumulated and released in proper sequence irrespective of the speed at which the keyboard is operated.

It is a further object of the invention to provide other new and improved details of structure which will be hereinafter described and pointed out in the claims, reference now being had to the accompanying drawings, wherein:—

Figure I is a perspective view of a section of a telegraph transmitter constructed according to my invention, the case and a part of the central portion of the machine being removed to better illustrate the mechanism.

Fig. II is a side elevation of the transmitter, the case being in section on the line II—II, Fig. III.

Fig. III is a rear elevation of same, the case being in section.

Fig. IV is a vertical section of same, the case being removed.

Fig. V is an enlarged perspective view of a portion of the chute, showing the spacing gates, the return tube and shutter, and the trip levers for releasing the spacing gates.

Fig. VI is an enlarged perspective of the spacing gate mounting, showing a tumbler in position for actuating the trip lever, by means of the shutter.

Fig. VII is a diagram showing the action of the tappets that operate the spacing gates.

Fig. VIII is a vertical section of part of the chute, the return tube and the conveyer tube, showing the by-pass and switch mechanism for deliverng pilot tumblers into the conveyer.

Fig. IX is a perspective view of the worm cylinder and the chute for delivering tumbler and pilot balls thereto.

Fig. X is a sectional view, showing the interior of the worm cylinder illustrated in Fig. IX.

Fig. XI is a detail perspective of the worm and its operating gear.

Fig. XII is a perspective view of the under side of the chute, showing a portion of the verge action, and the universal means for actuating the shutter.

Fig. XIII is a detail perspective of a portion of the shutter.

Fig. XIV is a dismantled view of a character unit.

Fig. XV is a side elevation of one of the character members and its driving mechanism.

Fig. XVI is a side elevation of the feeding cylinder, part of the conveyer and the cut off from the conveyer.

Fig. XVII is a perspective view of the lower end of the chute, showing a portion of the adjacent mechanism and means for conveying the pilot balls directly into the return trough.

Fig. XVIII is a detail perspective of part of the feeding cylinder.

Fig. XIX is a detail section of the top gate latch.

Fig. XX is a side view of same, showing its key lever locking link.

Fig. XXI is a detail view of the key lever locking arm.

Fig. XXII is a perspective view of the keeper set for insuring individual operation of the key lever.

Fig. XXIII is a perspective view of the governor.

Fig. XXIV is an elevation of the governor regulating cam.

Fig. XXV is a sectional view of a portion of the case, showing the means of attaching the frame-work to the casing.

Fig. XXVI is a sectional view of the contact breaker.

Fig. XXVII is a view of a modified form of clash gear in which the intermediate member is formed of rubber.

Fig. XXVIII is a side elevation of a modified form of releasing mechanism in which the key levers may be connected to the verge action or directly to the character disk release levers, so as to eliminate the magazine, if desired.

Referring more in detail to the parts:—

1 designates a casing having a body portion for containing the operative parts of the machine, and having a forwardly extended portion for inclosing the key-board, the body having an opening in its upper portion normally closed by a cover 2, but through which access may be had to the machine parts, and the extension having an opening 3 through which the keyboard is exposed, the entire case being preferably supported on rubber capped feet 4. In each side of the case are studs 5 (Fig. III), having end sockets for receiving pivot studs 6, that project from the sides 7 of the machine frame, to pivotally mount the frame so that it may swing in the case and permit the forward portion of the case to be lifted away from the machine when it is desired to expose the parts for cleaning or repairing.

Also fixed near the forward ends of the frame sides are brackets 8, having downwardly and laterally offset portions adapted to underlie the case lugs 9, and having thumb screws 10 adapted to turn freely therein and thread into the lugs 9, so as to secure the machine frame within the casing when the latter is in normal position.

Extending between the frame sides is a rear base plate 11 (Fig. IV) having a rod 12 extending therethrough, upon which the rear ends of a number of key levers 13 are pivotally mounted, all of the levers being extended forwardly through slots 14 in a plate 15 (Fig. XXII), on the front of the frame, the front plate having upper and lower buffers 16—16' upon which the levers may strike to insure a noiseless and cushioned action thereof when the machine is in operation.

In order to prevent more than one key being depressed at a time, I have provided a keeper mechanism comprising a plate 17 (Figs. IV and XXII), which is hung from the front of the frame between the front plate 15 and a plate 18, the latter having downwardly opening slots 19 in alinement with the slots 14 in plate 15.

Loosely mounted in downwardly opening sockets 20 in the lower edge of plate 17 are the heads 21 of depending interlock members 22 comprising shanks 23 and laterally flared heads 24, which latter are spaced so that when a single key lever is lowered all of the heads are moved laterally and closed against each other, to prevent a second lever from being lowered until the first has been lifted and the heads released.

Referring now to the magazine for the key controlling tumblers:—

25 (Figs. IV and XII particularly) designates a hopper comprising a base plate 26 which extends across the upper portion of the frame, and has a cover 27 spaced thereabove to allow free travel of the tumblers and pilot balls while protecting same from accident or contact by other parts. In the upper surface of plate 26 are longitudinal grooves 28 which correspond with the key levers in number and arrangement, and in each groove are balls 29 which are held on the upper base plate 26 by a verge mechanism, comprising an individual lever 31 for each set of balls; all of the levers being pivotally mounted on a common shaft 32 carried by hangers 30 and held automatically in normal position by springs 33. Each of the levers 31 is adapted to enter a slot 34 in the lower edge of the base plate 26 and opening into the grooves 28; and has an arc shaped upper surface projecting slightly above the base of the groove and provided with a notch 35 for receiving and holding the lowest ball in its set. Each of the levers 31 is connected with one of the key levers 13 by a link 36 so that when a key lever is depressed it rocks its lever 31 to forward the ball resting in the notch 35, and hold the succeeding balls in the groove; the lever 31 and key lever 13 being brought back to their normal positions by the spring 33 as soon as the key lever is released.

Inclined downwardly and forwardly from hopper 25 is a chute 38, comprising a base 39 which is supported from the bottom of the machine by brackets 40, and has grooves 41 in alinement with the grooves 28 in the base of the hopper.

Pivotally mounted on the sides of the frame are arms 42, which carry an apron 43 (Fig. IV) that forms an extension of the chute and is yieldingly held in normal position by a spring 44, the apron being yieldable in order to allow the pilot balls to adjust themselves in the feeding cylinder before being carried into the extension segment and to eliminate rattling of the tumbler and pilot balls when the latter are forced thereagainst, as will presently be described.

Revolubly mounted in the sides of the frame, in front of chute 38 is a shaft 45, and fixed on said shaft is a cylinder 46 (Fig. XVIII) having circumferential grooves 47 in line with the grooves in the inclined chute and having longitudinal flutings 48, all of which are semicircular to receive the tumbler and pilot balls.

Fixed on shaft 45, at one end of the cylinder, is a gear wheel 49 which meshes with a large gear wheel 50 (Fig. IV) that is revolubly mounted on a stub shaft 51 on the machine frame. Fixed to the large gear wheel is a small gear wheel 52 that meshes with a large wheel 53 on the shaft 54 of a spring motor 55, whereby the active parts of the machine are actuated.

Underlying the forward part of cylinder 46 and supported by a bracket 56 on the main frame, is a segment 57 which is concentric with the cylinder and has grooves 58 in line with the cylinder grooves 47 and chute grooves 41.

Located between the segment 57 and apron 43 are shoes 60 which correspond in number to the cylinder and extension grooves and have grooves 61 in alinement therewith each of said shoes being carried by an independent lever 62 that is pivotally mounted on a shaft 63 which is mounted on and extends between brackets 56.

There is no shoe in front of the pilot ball groove, the segment having an extension arm 64 reaching to the apron and to which the pilot balls are delivered therefrom.

The forward end of each lever 63 comprises an arm 65 that projects through a guide 66 on the back of front plate 15, and has a head 67 at its free end pivotally mounted in a socket 68 in the lower edge of a trip lever 69, there being a trip lever set for each of the tumbler grooves.

The trip levers 69 are pivotally mounted on a rod 70 (Fig. XV) carried by the front plate 15, and extend forwardly through slots 71 therein, the rear end of each trip having an individual clash gear wheel 72 thereon, which is constantly in mesh with a single pinion 73 that extends the full width of the frame and is revolubly mounted in the side members 7, each clash gear being adapted for meshing with the gear wheel of a character member (presently described) when the lever is rocked. The front end of the lever has an arm 74 (Fig. XV) provided with a roller 75, which is adapted to seat in a keeper socket or ride on the periphery of a computing disk forming part of the character member, and has a spring 76 yieldingly tensioning the lever to hold the roller to its seat, the clash gear out of mesh, and the shoes 60 in receiving position.

Pinion 73 has a gear wheel 78 meshing with an idler 79 that is interposed between same and the motor gear 50, whereby the pinion is revolved constantly when the motor is active.

Referring now to the character forming mechanism.

Revolubly mounted on the shaft 80, which is carried by and extends between the sides of the frame, are individual character sets, each comprising a character disk 81, a driving gear wheel 82, and a computing disk 83, each set being rigidly mounted on a bushing 84, which is revoluble on the shaft 80; all of the bushings being in endwise abutment to prevent lost motion when the parts are in operation.

In each set the driving gear is of greatest diameter and located between the character and computing disks, its teeth being adapted to mesh with the teeth of the clash gear for that set when the lever 69 is rocked to lift the clash gear into mesh therewith, so that the character set may be driven from the constantly traveling pinion. The code disk is fixed to one side of the driving gear and has a plurality of sets of teeth 86 projecting from its circumference and spaced at regular intervals therearound, the teeth of each set being representative of dashes and dots of the Morse or other telegraphic code, and arranged in the order of such symbols in the letter or character for which the disk stands, so that when a set is wiped by the brush (presently described) the letter or character impulses are sent as with an ordinary hand key.

The computing disk is fixed to the opposite side of the driving gear and has a socket 87 for each set of teeth on the code disk; the sockets being curved to receive the roller 75 on the lever 69, and so arranged in relation to the character sets that when the lever is lifted the roller will ride on the rail of the disk until the character has been sent and will then drop into the next socket to lock the set in place.

The brush or contact maker which I prefer to use comprises a bar 90 (see Fig. IV) which is pivotally mounted between the sides of the frame, and has a downturned ear 91 slidably mounted on a screw 92, that is adjustably mounted in a boss 93 on the machine frame, and has a nut 94 adapted for engagement with the boss to limit the forward movement of the bar. A spring 95 surrounds the forward end of screw 92 and bears against the front face of ear 91 and against the head 96 of the screw to yieldingly hold said ear against the nut and prevent lost motion in the brush.

Projecting forwardly from the bar 90 are the brushes 98, each of which is adapted for engagement by the symbol teeth of one of the character disks 81 when the disks are actuated, to oscillate the bar and the arm 99, which rises from the bar.

When the arm 99 oscillates, it actuates a circuit breaker 100, the preferred form of which comprises a beam 101 (Fig. XXVI) that is rigidly secured to a screw 102 on the side of the frame and insulated from the frame by a collar 103, and from the screw by a bushing 104, and carries an adjustable contact screw 105 at its outer end.

Paralleling beam 101 is a vibrator bar 107, which is pivotally mounted on a bracket 108, also carried by the screw and insulated from the beam 101 by a strip 109, but being grounded on the frame through the screw. The vibrator carries a flat spring 110 which passes beneath the pivotal mounting and bears against a laterally turned shelf 111 that projects from one edge of the bracket 108 to hold the bar yieldingly against the contact screw, the spring being adjustable through a screw 112, which passes through its body and threads into the body of the vibrator bar.

A binding post 115 is mounted on but insulated from the frame and connected with beam 101 by a wire 114, and a binding post 118 is carried by and grounded in the frame. Line wires 116 and 117 are connected with the binding posts and with a receiving element (not shown) so that when the vibrator closes against the point 105 a circuit is completed through wire 116, post 115, wire 114, beam 101, point 105, vibrator 107, pin 102, the carrying frame, upon which the pin 102 and the second binding post 118 are grounded, and through the post 118 to the line wire 117.

In operating the machine without regard to the accumulation features presently described, when a key lever is pressed a tumbler and a pilot ball are liberated and pass down chute 38 onto apron 43, at which point cylinder 46, which is constantly revolving, engages the tumbler ball and forces it across the face of the shoe 60 for that particular set, depressing the shoe and thereby rocking its lever 62. When the lever 62 is rocked it in turn rocks its lever 69 to lift roller 75 out of the socket 87 in the computing disk 83 to free the character member, at the same time shifting the clash gear 72 around the driving pinion and into engagement with the gear 82.

When a tumbler has passed the shoe 60 the roller 75 travels along the rail of the computing disk until the character is completed and then, under the influence of the spring 76, drops into a succeeding notch, allowing the levers to rock and disengage the clash gear automatically from the driving disk.

After leaving the shoe 60 the ball passes along the grooves 58 in the segment 57, and drops into a trough 130 (Fig. IX), which is inclined downwardly and laterally and terminates in a tubular member 131, which is adapted for delivery into a spiral groove 132 in the elevator cylinder 133.

Revolubly mounted in the cylinder is a worm 135, having a gear wheel 136 meshing with a gear wheel 137, on the cylinder shaft 45, so that the worm is driven synchronously with the cylinder.

The spiral groove terminates in a tube 139 which rises from the top of cylinder 133 and continues upwardly along the chute 38 and hopper 25, terminating in a goose neck 134, which opens into the upper end of the hopper, so that when the tube is full each ball, as it enters the elevator cylinder, is caught by the worm and forced against the balls already in the elevator tube, to raise the latter so that a ball is fed into the hopper whenever a new ball is dropped into the cylinder.

With the mechanism heretofore described the character sets may be actuated singly, but without accumulation. In order to increase the efficiency of the machine, I provide the following mechanism, whereby the tumblers are stored to release and effect the actuation of the character sets in proper sequence irrespective of the speed at which the key board is operated.

Pivotally mounted near each end of the cylinder 46 are arms 208, which are yieldingly held in elevated position by a spring 210 and connected by bars 209 and 212, the former of which lies beneath the shoes 60 so that it is engaged thereby when the levers 62 are actuated, and the latter of which is adapted to move into the path of down-coming tumblers when the arms are rocked as described, to stop said tumblers before they reach the cylinder. As the shoes remain in lowered position all of the time that a character member is being sent, it is apparent that the stop bar 212 will hold a succeeding tumbler out of the cylinder until the character is completed and thereby obviates simultaneous actuation of character members.

The chute 38 has, in addition to the grooves 41 for each key lever set, a groove 120 which extends through the upper face of the plate and into the hopper 25, where it contains a number of balls which are identical with and may serve as tumblers, but are, when used in the following connection, designated pilot balls, and which, when released by their verge, drop downwardly through shute 38 and when allowed to do so by the bar 212, pass across the segment extension, directly into the segment 57, and are carried idly therearound by the cylinder 46 and dropped into the trough 130 where they are elevated into the tube 139.

Located at the top of groove 120 and at the base of the hopper, is a verge action 121 (Fig. XII) which is identical with the verge actions 31, heretofore described and is also pivotally mounted on the shaft 32 which carries the tumbler verges. The action 121 has a rod 123 extended therethrough and beneath arms 31' of the tumbler verges so that when any one of the tumbler verges is depressed by its key lever 13, the rod 123 is depressed thereby and the pilot verge is rocked to drop one of the pilot balls into the chute.

The rod 123 has its ends projected into arms 124 which are pivotally mounted on the shaft 32, one of the arms having a spring 125 connected therewith so that the rod is yieldingly held against the bottom of the verge arms 31', the spring being preferably connected with an arm 126 which is pivotally mounted on the side of the hopper and adapted for adjustment by a screw 127.

With this mechanism, each actuation of a key lever 13 not only releases one of the tumbler balls into the chute, but also releases one of the pilot balls, the full portions of the verges serving to arrest succeeding balls while those in the verge sockets are being delivered to the chute.

Extending across the chute 38 are gates 140, (Figs. IV, V and VI), each of which has downwardly offset ends 141 terminating in stub axles 142 by which they are pivotally mounted in the sides of the chute, each bar being triangular in cross-section and having its upper right hand corner cut away to form a flat bearing face 143, and having a flat bar 144 secured to its under face beneath the flattened portion and adapted to engage the flattened part of the next higher gate when the parts are in open position, to keep the gate from rising sufficiently to allow the latches hereafter described to rise to their full lock position.

At their left-hand ends the gates 140 are provided with springs 145 which connect with the side of the chute and normally, yieldingly tension the gates downwardly so that tumbler and pilot balls may be held thereby when delivered from the verges or from higher gates, all of the gates being held upwardly by the latches (presently described) when the machine is to be put in use.

Extending in longitudinal alinement within a channel 172 (Figs. V and VI) adjacent the pilot groove and beneath the conduit 152, is a row of latches 173, each of which is adapted for controlling a single gate 140, the lower latch being operable by the bar 212, and the upper ones by the successive gates. Each latch comprises a head 174 which is revolubly mounted in the groove 175 in the channel 172, and a body 176, having beveled corners 177 and 178. The body 173 has a leaf 179 projecting from its lower edge and engaged by a spring 180, which is seated on the head of a screw 181 that projects into a socket in the base 39 and regulates the tension of the spring. A pin 182 projects laterally from the upper edge of the body and over the pilot groove in position for engagement by a ball located therein.

When the latches are in their normal position, i. e. projected yieldingly toward the pilot groove, the upper end of each latch is engaged by the lower end of the bar 144 of the next higher gate and holds the gate sufficiently open for the balls to pass thereunder.

In order, however, to feed the tumbler and pilot balls in single pairs, I provide means for rocking the latches individually to release their gates, such mechanism comprising a shutter 183 having a circular head 184 that is revolubly mounted in a circular groove that extends longitudinally throughout the length of the base of chute 38, between the pilot ball groove 120 and the next tumbler groove, the shutter being so located that when moved laterally it engages pilot balls in the groove 120 and moves the balls against the pins 182 of the latches 173.

On the upper end of the shutter is a downturned lever arm 187 (Fig. XII) which projects through slot 188 in the base of the chute and is adapted for engagement by a lever 189 on the verge rod 32, so that the shutter is moved laterally against the tension of its spring 190 when the verge is rocked with the depression of each key lever.

With this mechanism, when a key lever has been struck, a tumbler and a pilot ball are dropped through the chute, pass into the cylinder, and set a character member. Should a second key be struck before the first character is completed, a second pair of balls are dropped into the chute, but owing to the bar 212 being held down by the shoe of the first character lever, they are stopped by said bar at the base of the chute. Should a third key be struck while the second pair of balls is behind bar 212, the lateral movement of the shutter (which is actuated each time a key lever is struck) presses the pilot ball lying back of bar 212 aginst the pin 182 of the latch 175 for the bar 212 and rocks the latch to a vertical position. As the latch rises it moves from under the front end of the strip 144 of the bottom gate, and that gate is rocked downwardly by its spring 145 and stops the oncoming balls. With a pilot ball behind the lower gate, actuation of another key lever before that ball has been released will cause the next higher gate to be released in the same manner, and so on throughout the series.

The mechanism just described only serves to hold the balls in the proper grooves and in the order in which the keys are actuated, the following mechanism being provided for opening the gates in proper sequence to allow them to feed to the cylinder.

Pivotally mounted on the righthand axle of each gate is a tappet 192, which is connected with the adjacent, downturned end of the gate by a spring 193 that is stronger than the spring 145 on the opposite end of the gate, so that it will rock the gate to open the channel in the chute when the tappet is rocked, as will presently be described.

Each tappet has an ear 194 at its upper end which projects into a groove 195 in the bottom of a conduit 196, formed as a rib-like extension of a tube 152 which cuts into the return tube 139 a short distance above the worm cylinder and near the top of the chute, and is adapted for carrying balls back to the chute.

A worm 198 is located within the conduit 152 and has a shaft 199 provided with a beveled gear wheel 197 which meshes with a gear wheel 200 on the shaft of cylinder 46, so that the worm is driven constantly when the cylinder is in action, to elevate the balls through the conduit.

In a by-pass 202, which connects the conduit 196 with the return tube 139, is a slot 203, and projecting from the by-pass adjacent the slot is an ear 204.

Pivotally mounted on the ear 204 is a latch member 205, having a tooth 206 projected through the slot 203 into the by-pass in position to stop the balls therein, and having an upper stop tooth 207, which is normally held outside of the tube but adapted for projection thereinto to hold the column of balls when the lower finger is rocked out of the by-pass to allow the bottom ball to drop into the conveyer conduit (Fig. VIII).

The latch member 205 is adapted to release one of the balls into the conveyer whenever a tumbler enters the cylinder, by means of a pin 211 (Fig. XVI) which is mounted on one of the arms 208 and projected into an aperture 205' in the latch 205, so that the latch is rocked when the bar 212 is lowered.

Whenever the bar 212 is lowered the bottom ball in the conduit 196 is delivered into the worm and forced upwardly thereby against the lower ball in the return tube, raise the balls therein and thereby open the gates and stop the tumbler and pilot balls. As the ball in the conduit passes over the tappet for the lower gate it rocks the tappet and the spring 193—being stronger than the spring 145—rocks the gate so that it lifts and releases the third set of balls, which then drop back of the bar 212.

It is apparent that should the keyboard be operated with sufficient rapidity to bring a number of or all of the gates into operation, a ball traveling up the conduit will actuate the active gates in turn so that the tumbler balls are delivered to the cylinder in proper order. The latches and gates are so constructed that, when an upper gate is down, a lower gate may be rocked sufficiently to allow the tumbler to pass, but not sufficiently to allow the latch to assume its locking position.

In order to avoid confusion of the tumblers at the top of the chute should all of the gates be filled, I provide mechanism for locking the keyboard from the latch of the next to the top gate, when that latch is actuated to release the top gate, such mechanism comprising an arm 214 which is attached to the latch and adapted for actuating a bell crank lever 215, one arm of which is connected with the arm 214, and the other arm with a link 220 which is adapted to actuate an arm 221 to project the same between two of the keeper hangers 22 and lock the keyboard until the machine has caught up with the operator.

In order that the machine may be operated directly from the keyboard instead of through the tumbler mechanism, the verge links 36 may be provided with pins 225 (Fig. XXVIII), which are adapted for holding beneath the lips 226 formed on the key levers by providing said levers with the upwardly opening and backwardly extending slots 227, and directly connecting each character member set with its key lever by a link 228 which is pivotally connected with an arm 229 on the lever 69, and has a tooth 230 adapted for projection beneath a pin 231 on the key lever 13.

It is apparent that the springs on the levers 69 will hold the links to the lever pins and the verge links out of the lever bars unless restricted, and in order to keep the connection between the character members and tumbler mechanism, I provide a keeper 232, which is pivotally mounted on the frame and carries a rod 233 in front of the links 228, so that when the keeper is moved rearwardly, all of the link teeth will be moved from under the lever pins and the pins of the verge links will be moved beneath the lips 226. In order to hold the parts in either position, I provide the keeper with notches 237 into either of which the spring 238 is adapted to project to hold the keeper.

In order to limit the speed of the spring motor, I provide a governor comprising a shaft 239, which is revolubly mounted in bearings in the side of the frame and in a bracket 240 carried by the frame, and is connected with the shaft 45 and gear 137 through gear wheels 241, 242, 243 and 244.

Keyed on the shaft 239 is a collar 246, having governor weights 247 pivotally mounted thereon, and held yieldingly toward the shaft by the springs 248, which are carried by a collar 249, also mounted on the governor shaft.

Slidably mounted in a bearing 250 on the side of the frame is a rod 251, which is exposed through an opening 252 in the bearing 250 and adapted for engagement by a spring 253 that is secured to the side of the frame and tensioned so as to normally hold the rod outwardly against the collar.

Revolubly mounted in the casing 1 adjacent to rod 251 is a tapered segment 252', which is rigidly secured to a shaft 253' (see Fig. XXIV) that projects to the outside of the case and is provided with a knob 254.

The inner face of the segment is tapered, as shown at 255, and provided with stop members 256, so that by turning the knob 254 the rod 251 is moved inwardly or outwardly to vary the position of the leather covered tip 254' to offer variable resistance to the governor when it has reached a speed great enough to move the collar 246 thereagainst.

The spring motor may be of any suitable type, but is preferably provided with the usual winding crank 258.

Briefly describing the use and operation of the device:—

When the machine is to be used, the hopper and return tube are filled with balls, the latches set to hold the gates in raised position and the motor started, to revolve the elongated pinion 73.

When a message is to be sent, the keyboard is operated in the usual manner, the first key struck rocking the verge for that key so that the ball in this verge is released and allowed to pass down the chute beneath the open gates and beneath the cylinder. The cylinder when in revolution, catches the tumbler in one of the grooves and presses it against the shoe for that key, lowering the shoe so that the shoe lever is rocked to rock the lever that controls the character member for that key.

When the character member level is rocked it releases the character member and throws the clash gear into mesh with the constantly traveling pinion revolving the member to actuate the circuit breaker and send the character.

While the character is being sent the character lever is held by the rail of the computing disk and holds the shoe down, the latter holding the stop bar so that should a second key be struck before the character is completed the tumbler released by that key will be held by the bar and prevent its entrance to the cylinder, thereby obviating the confusion which would result from simultaneous actuation of two character members.

The tumbler and pilot balls pass together through the cylinder—the pilot idly—and after the actuation of the character member are delivered over the edge of the extension and into the worm casing. The worm then forces both balls into the return tube through which they are delivered back to the hopper, the shutter and gate tappets working idly because there are no pilot balls to transmit motion to the gate latches.

It is apparent that this operation may be continued until the message has been sent, but, leaving the gate mechanism out of consideration, that care must be taken not to operate the keyboard faster than the individual characters are sent, to obviate piling up of the tumblers back of the stop bar.

Presuming, however, that the first tumbler were in the cylinder, and a tumbler and pilot ball back of the stop bar, should a third key be struck, the shutter, which works with each key, is moved laterally and engages the pilot ball that lies against the stop bar, pushing the ball against the bottom latch and lifting the latch so that the latch bar of the bottom gate may pass the latch. The bottom gate, being under tension, then drops down and catches the third tumbler and pilot, the first tumbler and pilot passing to the return tube and the second tumbler and pilot to the cylinder.

Simultaneously with the action of the bar 212, the latch 205 is actuated to drop a ball into the by-pass so that it may be carried up by the worm, engage the tappet of the bottom gate and rock the gate to release the third tumbler and pilot, the gate swinging its full limit because the next higher gate is not in place to be engaged by the latch bar of the first gate. When the bottom gate lifts as described, the tumbler and pilot balls are released and the latch flies back to its holding position, to be again actuated when another key is struck.

Presuming further that a fourth key is struck before the first character is completed and while the second pilot and tumbler are held by the bar 212 and the third pilot and tumbler are held by the first gate, the shutter acts on the pilot which is held by the first gate, to actuate the latch for the second gate, so that the stop bar on the second gate is released and allowed to drop so that the fourth tumbler is caught thereby, the second pilot and tumbler being still held by the bar 212 and the third pilot and tumbler by the first gate.

When the second gate is down, the pilot ball acting on the tappet of the first gate rocks that gate far enough to release the ball, but the latch bar on said first gate engages the flattened part of the second gate and stops the first one before it has lifted high enough for the latch to snap back, the tappet spring yielding to allow the tappet to complete its travel and the actuating ball to pass thereover.

This action of the gates is illustrated in the diagrammatic view (Fig. VII) where the first gate on the lift is shown in position for holding the balls, the second gate is shown lifted to allow a ball to pass and with its stop bar engaging the next higher gate to prevent its raising sufficiently to allow the latch for the next higher gate to return to set position and showing its tappet carried on against the tension of its spring, the third gate in holding position, and the fourth gate in original or open position.

It is apparent that a ball traveling up the conduit will release the tumblers and pilot pairs in sequence and that when released the balls will be stopped against the next lower gate so that there is never more than one set of balls behind any gate at the same time and the characters are therefore sent in order in which the keys are struck.

When all the gates are down, the latches are all up and the last latch locks the keyboard until the machine has cleared, when the operator may continue sending, thereby obviating confusion at the top of the chute.

Having thus described my invention, what I claim as new therein and desire to secure by Letters-Patent, is:—

1. A telegraph transmitter comprising character members, means for actuating the character members, individual floating members for controlling said actuating means, and means for selectively directing said floating members to actuate predetermined characters.

2. A telegraph transmitter comprising independently operable character members, mechanism for actuating the character members, independent tumblers for effecting coöperation between the character members and actuating mechanism, a hopper for containing said tumblers, and means for selectively releasing said tumblers from the hopper.

3. A telegraph transmitter comprising independently operable character members, mechanism for actuating the character members, independent tumblers for effecting coöperation between the character members and actuating mechanism, a hopper for containing said tumblers, means for selectively releasing said tumblers from the hopper, and single means for returning all of said tumblers to the hopper.

4. A telegraph transmitter comprising character members, a prime mover, setting devices between said character members and prime mover, and tumblers for tripping said setting devices.

5. A telegraph transmitter comprising individually operative character members, a prime mover, setting devices between said character members and prime mover, individual tumblers for tripping said setting devices, and means for releasing said tumblers.

6. In a telegraph transmitter, character members, mechanism for actuating the character members comprising a single drive member and individual transmission for each of the character members, a setting cylinder, and tumblers adapted for coöperation with the setting cylinder to trip said character transmission to render the character members operative.

7. In a telegraph transmitter, individually operative character members, a single driver, transmission members constantly meshing with the driver and adapted for connection with the different character members, a setting cylinder, shoes located adjacent the cylinder and connected with the transmission members, and tumblers adapted for coöperation with the cylinder and shoes to rock the transmission members substantially as set forth.

8. A telegraph transmitter comprising character members, a single driving pinion, a pivotally mounted lever for each character member having a gear wheel constantly meshing with the pinion and adapted for meshing with the character member, means for yieldingly retaining said lever out of operative engagement with the character member, a setting lever connected with the first named lever and having a shoe, a cylinder revolubly mounted adjacent the shoe, tumblers adapted for travel between the cylinder and shoe, and means for controlling the tumblers, for the purpose set forth.

9. In a telegraph transmitter, a plurality of individually operative character members, a single driving pinion, a lever for each character member adapted for locking engagement therewith, and having a gear wheel constantly meshing with the pinion and adapted for driving the character member, a setting cylinder, a setting lever connected with the first named lever and having a shoe located adjacent the cylinder tumblers and means for directing tumblers between the cylinder and shoe, for the purpose set forth.

10. In a telegraph transmitter, a single circuit breaker, a plurality of character members, each comprising a gear wheel, a character disk and a computing disk, a trip lever pivotally mounted adjacent each character member, and having an arm yieldingly engaging the computing disk, and having a gear wheel adapted for engaging the gear on the character member, a constantly revolving pinion meshing with all of the trip lever gears, a setting member, tumblers adapted for travel along the setting member, and means connected with the trip lever and adapted for actuation by the tumblers for guiding the trip lever, substantially as set forth.

11. In a telegraph transmitter comprising a plurality of individually operative character members, means for driving said members, and a control mechanism comprising a setting cylinder, a setting lever having a shoe located adjacent the cylinder, a tumbler chute, and tumblers adapted for travel through the chute and between the cylinder and shoe, for the purpose set forth.

12. In a telegraph transmitter, a circuit breaker, a plurality of individually operative character members, means for driving said members, and a controlling mechanism comprising a setting cylinder, having a peripheral groove for each of the character members, a tumbler chute having an extension underlying the cylinder, tumblers adapted for travel in said chute, and a setting lever connected with the member driving means, and having a shoe projected through the tumbler chute and adapted for actuation by a tumbler during the travel thereof beneath the cylinder, substantially as set forth.

13. In a telegraph transmitter, a circuit breaker, a plurality of individually operative character members, a single driving pinion, individual means for engaging the pinion with each character member, a setting lever for each of said individual means, a setting cylinder, tumblers adapted for travel between the cylinder and said setting levers, and keys for releasing tumblers selectively, for the purpose set forth.

14. In a telegraph transmitter, a circuit breaker, a shaft located adjacent the circuit breaker, a plurality of individual character members revolubly mounted on said shaft independently of each other, and each comprising character and gear disks, a single constantly revolving pinion paralleling the said shaft, a trip lever for each character member, having a wheel revolubly mounted thereon in constant engagement with the pinion, a setting cylinder having a circumferential groove for each character member, and having a plurality of longitudinal grooves, a tumbler chute located adjacent the cylinder and having an extension spaced therefrom and located beneath the cylinder, a setting lever operatively connected with each trip lever and having a shoe projected beneath one of the cylinder grooves, tumblers adapted for travel through the chute and over said shoes, means for holding the tumblers, and a key lever for each character member, having means for releasing the tumblers selectively, for the purpose set forth.

15. In a telegraph transmitter, a circuit breaker, a plurality of individually operative character members, each comprising a character disk, a gear disk and a computing disk, the character disk having tooth sets and the computing disk having peripheral sockets corresponding to the tooth sets on the character disk, a constantly revolving pinion located adjacent the character members, a trip lever for each character member having a locking head yieldingly held toward the computing disk to lock in said sockets, or ride on the periphery of the disk when released, a gear wheel pivotally mounted on each of said levers and adapted for connecting the pinion with the gear disk on the character member, and a selective mechanism for releasing the trip levers.

16. In a telegraph transmitter, a plurality of individually operative character members, a circuit breaker, a selective mechanism comprising a setting cylinder having a circumferential groove for each character member, and a plurality of longitudinal grooves, a tumbler chute extending beneath the cylinder, a setting lever for each character member, having a shoe projected through the chute, tumblers adapted for travel through the chute and beneath the cylinder to rock said shoes, gates for holding said tumblers in the chute and key levers having connection with said gates, whereby the tumblers are released singly, for the purpose set forth.

17. In a telegraph transmitter, a plurality of individually operative character members, a circuit breaker, actuating mechanism for the character members, and a selective mechanism comprising a setting lever for each operating device, a tumbler chute, tumblers adapted for travel through said chute and over the said levers, means for pressing said tumblers against the said levers to rock same, means for retaining the tumblers in said chute and key levers having connection with the retaining means, whereby the tumblers are released singly, substantially as set forth.

18. In a telegraph transmitter, a plurality of individually operative character members, a circuit breaker, a driving device for each character member, and a selective mechanism comprising a constantly revoluble member, a tumbler chute having a groove for each character member, tumblers adapted for travel through said grooves into contact with the revoluble member, a setting lever for each driving device having a shoe projecting through the tumbler chute adjacent the revoluble member, means for holding said tumblers in the chute and key members connected with said holding means whereby the tumblers are fed to the proper chutes, for the purpose set forth.

19. In a telegraph transmitter, a circuit breaker, a plurality of individually operative character members adapted for actuating the circuit breaker, means for driving the character members, a setting device connected with each of the driving means and provided with a shoe, a tumbler chute adapted for conducting tumblers over said shoes and having a groove for each character member, tumblers adapted for travel in said chute, means for retaining tumblers within the chute, key levers having connection with said holding means whereby the tumblers are released singly, and a constantly revoluble member adapted for forcing the tumblers against said shoes, for the purpose set forth.

20. In a telegraph transmitter, a plurality of individually operative character members, a circuit breaker, a driving device for each character member, a tumbler chute, tumblers adapted for travel in said chute, means for holding tumblers singly within the chute, a hopper adapted for delivering tumblers into the chute, a key lever for each character member, and means connected with the key levers for delivering tumblers to selected positions within the chute.

21. In a telegraph transmitter, a plurality of individually operative character members, a circuit breaker, a driving device for each character member, a tumbler chute having a separate space for each character member, tumblers adapted for travel in said chute, a hopper, means for releasing tumblers selectively from the hopper to the chute, gates for retaining said tumblers singly within the chute, means for actuating said gates to release the tumblers singly, a constantly revoluble tension member, and a setting lever for each character member driving device, having a shoe adapted for engagement by the tumblers during their travel beneath the revoluble member, substantially as set forth.

22. In a telegraph transmitter, a plurality of individually operative character members, a circuit breaker, an operating device for each character member, a tumbler chute having a groove for each character member, tumblers adapted for travel in said chute, gates extending transversely across the chute and adapted for holding the tumblers singly therein, a hopper at the top of the chute, verge levers between the hopper and chute, key members connected with the verge levers and adapted for delivering the tumblers singly to the chute grooves, a constantly revoluble member located over a portion of the chute, means for rocking said gates to release the tumblers singly and setting levers connected with the actuating devices, and having shoes adapted for depression by the tumblers during the travel of the latter beneath the revoluble member, substantially as set forth.

23. In a telegraph transmitter, a circuit breaker, a plurality of individually operative character members, an actuating device for each character member, a tumbler chute having a groove for each character member, tumblers adapted for travel in said chute, means for holding the tumblers within the chute, a hopper at the top of the chute, a verge lever for each of the chute grooves adapted for delivering tumblers singly into the chute, a key lever connected with each verge lever, means for releasing the tumblers singly from the chute, and means coöperating with the tumblers to rock a relative actuating device to operative position, for the purpose set forth.

24. A telegraph transmitter comprising a plurality of individually operative character members, a circuit breaker, an actuating device for each member, a tumbler chute having a division for each character member and a pilot tumbler division, tumblers adapted for travel in said chute, a hopper adapted for delivering into the chute, a verge lever for each division of the chute, a key lever connected with each of said verge members except the lever at the pilot position whereby a single tumbler is delivered into the character member grooves by the action of each key lever, means whereby the pilot verge is actuated upon the actuation of any of the character member verges, and means for coöperation with the tumblers to render the character member actuating devices operative, substantially as set forth.

25. In a telegraph transmitter, a plurality of individually operative character members, a circuit breaker, an actuating device for each character member, a tumbler chute having a groove for each character member, tumblers adapted for travel in said chute, pivotally mounted gates extending across the chute, means for yieldingly retaining said gates in open position, an elevator extending adjacent said gates, means on the gates projecting into the elevator and adapted for engagement by tumblers traveling therein to release the gates, latches for limiting the movement of said gates, means for moving tumblers against said latches to actuate same, a revoluble member adapted for engagement with tumblers traveling through the chute, and a setting lever having a shoe adapted for engagement by said tumblers, for the purpose set forth.

26. In a telegraph transmitter, a plurality of individually operative character members, a circuit breaker, an actuating device for each character member, a tumbler chute having a separate groove for each character member, setting levers connected with the actuating devices, and having shoes projected into said chute, tumblers adapted for travel in said chute, a roller located above the chute and adapted for pressing tumblers against said shoes, pivotally mounted gates extending over the chute, means for rocking the gates, pivotally mounted latches adapted for limiting the movement of the gates, a key lever for each character member, a verge lever connected with each key lever and adapted for releasing tumblers into the chute, a shutter within the chute adapted for actuation by each of the verge members and for moving pilot tumblers against said latches to elevate same, a latch for each of said gates, pilot tumblers adapted for location between the latches and shutter, whereby the latches are rocked by the rocking of the shutter and means for opening said gates with the actuation of each of the key levers.

27. In a telegraph transmitter, a plurality of individually operative character members, a circuit breaker, an individually operative actuating device for each character member, a tumbler chute having a separate groove for each character member, tumblers adapted for travel in said chute, setting levers connected with the actuating devices and having shoes projected through said chute, a roller revolubly mounted above the shoes and adapted for forcing tumblers thereagainst, key levers, a verge action connected with each key lever and adapted for feeding tumblers singly into the grooves in said chute, a gate having offset ends pivotally mounted in the chute and having a body portion extending over the grooves, springs yieldingly tensioning said gates toward closed position, a tumbler elevator extending over said gates and having a bottom slot, a trip on each of said gates projecting into the elevator slot whereby the gate is rocked to open position, latches adapted for limiting the movement of said gates, pilot tumblers for engaging said latches, a shutter carried by the chute and adapted for pressing pilot tumblers against the latches, means for actuating the shutter with the actuation of each key lever, and means for conducting tumblers from the bottom of the chute to the elevator.

28. In a telegraph transmitter, a plurality of individually operative character members, a circuit breaker, an individually operative actuating device for each character member, a tumbler chute having a separate groove for each character member, tumblers adapted for travel in said chute, setting levers connected with the actuating devices and having shoes projected through said chute, a roller revolubly mounted above the shoes and adapted for forcing tumblers thereagainst, key levers, a verge action connected with each key lever and adapted for feeding tumblers singly into the grooves in said chute, a gate having offset ends pivotally mounted in the chute and having a body portion extending over the grooves, springs for yieldingly retaining said gates in closed position, a tumbler elevator extending over said gates and having a bottom slot, a trip on each of said gates projecting into the elevator slot whereby the gate is rocked to open position, latches adapted for holding the gates, pilot tumblers adapted for engagement by said latches, a shutter carried by the chute and adapted for pressing pilot tumblers against the latches, means for actuating the shutter with the actuation of each key lever, a bar fixed to each of the gates and adapted for engagement with a succeeding gate when the latter is closed to prevent the complete opening of the first named gate, for the purpose set forth.

29. In a telegraph transmitter, a plurality of individually operative character members, a circuit breaker, a tumbler chute, tumblers adapted for travel in said chute, pivotally mounted gates extending over said chute, a bar on each of said gates adapted for engagement with the succeeding gate when the latter is in closed position to prevent the complete opening of the first gate, means for rocking said gates, a latch member for each of said gates, pilot balls adapted for engagement by said latches, a shutter adapted for forcing pilot balls against said latches to move same to operative position, means for releasing tumbler and pilot balls into the chute, a roller extending across a part of the chute, setting levers having shoes adapted for projection into said chute and adapted for engagement by the tumbler through the chute, substantially as and for the purpose set forth.

30. In a telegraph transmitter, a plurality of individually operative character members, a circuit breaker, a tumbler chute, tumblers adapted for travel in said chute, gates for retaining tumblers within the chute, means for rocking said gates, pilot balls, latches for holding said gates and comprising means adapted for engagement by said pilot balls and a spring adapted for retaining same in active position, a lever connected with the last latch in the chute, and having a key operatively connected therewith and adapted for locking the key levers of the machine, key levers adapted for releasing the tumblers and pilot balls into the chute, and means adapted for actuation by said tumblers to render the character members individually operative.

31. In a telegraph transmitter, a plurality of individually operative character members, a circuit breaker, an individual actuating device for each character member, a tumbler chute having individual grooves for each character member, tumblers adapted for travel in said chute, a verge lever controlling the intake to each groove, a hopper for holding tumblers back of the verge members, a shutter in said chute forming a pilot groove parallel with the tumbler grooves, pilot balls adapted for travel in said pilot groove, a verge member controlling the intake to the pilot groove, a rod extending back of the tumbler verges and operatively connected with the pilot verge, whereby the latter is actuated to deliver a pilot ball with the delivery of each tumbler ball, a setting lever for each actuating device having a shoe projected through the chute, and a roller extending across the chute, and adapted for forcing tumbler balls against the shoes, substantially as and for the purpose set forth.

32. In a telegraph transmitter, a plurality of individually operative character members, a circuit breaker, an actuating device for each character member, a tumbler chute, tumblers adapted for travel in said chute, a setting lever for each actuating device having a shoe projected into said chute, means for delivering tumblers singly to the chute, a shutter in said chute forming a pilot division, pilot balls adapted for travel in said division, key levers, verge members connected with the key levers and adapted for delivering tumblers to the chute, a trip connected with said shutter and adapted for actuation with any of the verge members to move the shutter against the pilot balls, and latches adapted for actuation by the lateral movement of said pilot balls.

33. In a telegraph transmitter, a plurality of character members, a circuit breaker, an individual actuating device for each character member, a tumbler chute, tumblers adapted for travel in said chute, means for controlling tumblers within the chute, pilot mechanism for releasing tumblers from the chute individually and in proper order, and mechanism adapted for coöperation with the tumblers to actuate each of the character members individually.

34. In a telegraph transmitter, a plurality of individually operative character members, a circuit breaker, a tumbler chute, tumblers adapted for movement in said chute, gates extending across the chute, a conduit, means for conducting tumblers to said conduit, means for forwarding tumblers through said conduit, and means on the gates for engagement by tumblers within the conduit whereby said gates are rocked, for the purpose set forth.

35. In a telegraph transmitter, individually operative character members, a circuit breaker adapted for actuation from said members, individual devices for actuating the character members, tumblers adapted for releasing said actuating devices, a tumbler chute, a return conduit for the tumblers, gates extending over the chute and adapted for holding tumblers therein, and tappets on said gates projected into the conduit and adapted for engagement by tumblers therein to rock the gates and release the tumblers in the chute, substantially as set forth.

36. In a telegraph transmitter, a plurality of individually operative character members, means for actuating said character members, a circuit breaker, tumblers adapted for releasing the character members a chute having tumbler paths and a pilot path, means for simultaneously releasing tumblers from the tumbler path and pilot path, shoes in line with the tumbler path and adapted for actuation by the tumblers to release the character member actuating device, a return tube for conducting the tumblers to the top of the chute, a conduit opening into the return tube, means for directing tumblers from the return tube, into the conduit, means for positively driving tumblers through the return tube, and through the conduit, gates extending over the chute; and means on said gates projected into the conduit whereby the gates are rocked by the engagement of the tumblers with said projecting means, for the purpose set forth.

37. In a telegraph transmitter, individually operative character members, a circuit breaker, an actuating device for each character member, tumblers for setting the actuating devices, a tumbler chute, gates for holding tumblers within the chute, key levers for releasing tumblers to the chute, a conduit for returning tumblers after travel through the chute, and means connected with the gates and adapted for engagement by the return tumblers to rock the gates and release the tumblers substantially as set forth.

38. In a telegraph transmitter, individually operative character members, a circuit breaker, an actuating device for each character member, tumblers for setting the actuating devices, a tumbler chute, gates for holding tumblers within the chute, key levers for releasing tumblers to the chute, a conduit for returning tumblers after travel through the chute, and means connected with the gates and adapted for engagement by the return tumblers to rock the gates and release the tumblers, and latches adapted for locking said gates when all of the gates are raised to the limit of their throw.

39. In a telegraph transmitter, a plurality of individually operative character members, a circuit breaker, individual means for actuating the character members, tumblers for controlling said actuating means, a tumbler hopper, a chute, gates for holding tumblers within the chute, means for releasing tumblers from the hopper to the chute, key levers for actuating said releasing means, a return conduit for tumblers, means on the gates adapted for actuation by returning tumblers to rock the gates and release incoming tumblers, a latch adjacent each gate comprising a revoluble head, a body portion having a pin projected toward the chute, and a spring for yieldingly retaining the pin in projected position, and a shutter adapted for moving tumblers within the chute against said pins with each actuation of a key lever, said latches having beveled points over which the gates are adapted to move to release the tumblers, and having an upper portion adapted for locking the gates when the latter are moved to a locking position.

40. In a telegraph transmitter, a plurality of individually operative character members, a circuit breaker, individual means for actuating each of the character members, tumblers for controlling the actuating means, key levers for releasing said tumblers, gates for holding the tumblers in proper relation, latches for said gates, and means operative from one of the latches to lock said key levers, and render the machine inoperative, for the purpose set forth.

41. A telegraph transmitter comprising a plurality of individually operative character members, a single circuit breaker, an individual actuating mechanism for each character member, tumblers for controlling the actuating mechanism, key levers for releasing tumblers, an accumulator for said tumblers comprising gates for holding the tumblers in accumulative relation, means for locking the gates when the accumulator is full, and means connected with said locking mechanism for locking the key levers to prevent the further releasing of tumblers when the accumulator has been filled.

42. In a telegraph transmitter, a plurality of individually operative character members, a circuit breaker, individual mechanism for actuating each character member, a setting members, tumblers for tripping said setting member, a tumbler chute having a slot adjacent said member, levers connected with the actuating mechanism and having shoes projected into said slot, an apron located in the slot and over which tumblers are adapted to pass from the chute to reach said shoe, key levers and means connected with the key levers for releasing tumblers to the chute, and means for holding tumblers in proper relation within the chute.

43. In a telegraph transmitter, a plurality of individually operative character members, a circuit breaker, individual mechanism for actuating each of the character members, tumblers for controlling said actuating mechanisms, a tumbler chute and hopper, and a tumbler returning mechanism comprising a worm, a tube connecting the worm with the hopper, and means for actuating said worm to force tumblers through the tube, substantially as set forth.

44. In a telegraph transmitter, a plurality of individually operative character members, a circuit breaker, individual mechanism for actuating each of the character members, tumblers comprising setting levers, a chute for directing tumblers over said levers, means for forcing tumblers against said levers and for carrying the tumblers to a return position, a worm cylinder, a chute for conducting tumblers from the return position to the worm cylinder, a tube leading from the cylinder to the top of the chute and a worm located within the cylinder and adapted for forcing tumblers through the tube, substantially as set forth.

45. In a telegraph transmitter, a plurality of individually operative character members, a circuit breaker, individual mechanism for actuating the character members, tumblers, guiding mechanism for the tumblers, a tumbler mechanism for controlling the guiding mechanism, a tumbler chute leading to said tumbler mechanism, devices for simultaneously releasing and feeding tumblers through the chute and the tumbler mechanism, a return tube, a piloting conduit cutting into the return tube, means for returning the tumblers through the tube, mechanism for cutting out tumblers from the tube and delivering same to the conduit, means for forcing tumblers through the conduit, said tumbler controlling mechanism having parts projected into the conduit and adapted for actuation by tumblers traveling therethrough, for the purpose set forth.

46. In a telegraph transmitter, a plurality of individually operative character members, a circuit breaker, individual mechanism for actuating the character members, tumblers for controlling the actuating mechanisms, tumbler return mechanism comprising a main tube, and a conduit cutting into the main tube, a latch pivotally mounted adjacent the conduit and having an arm adapted for stopping the passage from the tube to the conduit, and a second arm for holding succeeding tumblers when the latch is rocked to pass a lower tumbler of the series, and means operable from the tumbler mechanism for actuating said latch at each actuation of the tumbler mechanism, for the purpose set forth.

47. In a telegraph transmitter, a plurality of individually operative character members, a circuit breaker, individual mechanisms for actuating the character members, tumbler mechanism comprising tumblers and levers having shoes thereon, means for conducting tumblers over said shoes, means for forcing the tumblers against the shoes to rock the latter, a tumbler return mechanism comprising a tube and a conduit having a by-pass connecting with the tube, a latch having arms projected into said by-pass and adapted for releasing tumblers into the by-pass individually, and a lever mechanism projected beneath the shoes and having connection with the latch whereby the latch is actuated upon actuation of any of the shoes, for the purpose set forth.

48. In a telegraph transmitter, a plurality of individually operative character members, a circuit breaker, individual mechanism for actuating the character members, tumbler mechanism for controlling the actuating mechanisms, and comprising a plurality of tumblers, a tumbler hopper, a chute and return tube, means for releasing tumblers through the chute, a conduit connected with the tube at upper and lower positions whereby tumblers are delivered from the tube to the conduit and back to the tube, means for selecting tumblers from the tube and feeding same to the conduit, a screw in said conduit for elevating tumblers therethrough and means on the tumbler controlling mechanism adapted for actuation by tumblers traveling through the conduit to release said mechanism, for the purpose set forth.

49. In a telegraph transmitter, a plurality of individually operative character members, a circuit breaker, an individual actuating mechanism for each character member, a tumbler chute, tumblers adapted for travel in said chute, lever shoes projected through the chute, a revoluble cylinder adapted for forcing tumblers against said shoes, a return conduit having a screw operatively connected with the cylinder and adapted for elevating tumblers, gates for controlling tumblers within the tumbler chute and having members projected into the conduit and adapted for engagement by the return tumblers, key levers and mechanism operable from the key levers for releasing tumblers to the chute.

50. In a telegraph transmitter, a plurality of individually operative character members, a circuit breaker, an individual actuating mechanism for each character member, tumbler mechanism comprising individual tumbler members, key levers for releasing the tumblers of said mechanism, a lever locking device comprising keeper hangers through which the levers are projected and adapted for preventing the simultaneous actuation of a plurality of levers, a latch operable from the tumbler mechanism, and an arm operable from the latch and adapted for projection between keeper hangers to lock the key levers, for the purpose set forth.

51. In a telegraph transmitter, a plurality of individually operative character members, individual actuating mechanism for each of the members, key levers for controlling the actuating mechanisms, a beam on said machine having a contact point, a bracket insulated from the beam and having a bar adapted for contact with said point, a spring for yieldingly tensioning the bar toward the point, and brushes adapted for actuation by the character members and for rocking the bar to vary the contact with the point, for the purpose set forth.

52. In a telegraph transmitter, a plurality of individually operative character members, individual mechanisms for actuating the character members, key levers for controlling the actuating mechanisms, a brush pivotally mounted adjacent the character members and having points for engagement therewith, a beam extending adjacent the brush and having a contact point, a bracket insulated from the beam, a bar pivotally mounted on the bracket and adapted for contacting the point, a spring for adjusting the tension of said bar, and a post on the brush adapted for rocking the bar, substantially as and for the purpose set forth.

53. In a telegraph transmitter, character and driving mechanism, setting mechanism, tumblers adapted for actuating the setting mechanism, gates for spacing the tumblers, and means for rocking the gates to release the tumblers in proper sequence.

54. In a telegraph transmitter, character and driving mechanism, setting mechanism, tumblers adapted for actuating the setting mechanism, gates for spacing the tumblers, and means for rocking the gates individually and in proper sequence.

55. In a telegraph transmitter, character and driving mechanism, setting mechanism, tumblers adapted for actuating the setting mechanism, gates adapted for holding the tumblers in storage, and means for acuating gates having tumblers in storage following the completion of each phase of the character mechanism.

56. In a telegraph transmitter, character and driving mechanism, setting mechanism, tumblers adapted for actuating the setting mechanism, gates for holding said tumblers in storage, means for yieldingly tensioning said gates toward holding position and latches for holding said gates open.

57. In a telegraph transmitter, character and driving mechanism, setting mechanism, tumblers adapted for actuating the setting mechanism, means for returning the tumblers after actuating the setting mechanism, gates for holding the tumblers in storage, means for yieldingly tensioning said gates to holding position, latches for holding said gates open, and means operable by the returning tumblers for returning said gates to open position.

58. In a telegraph transmitter, character and driving mechanism, setting mechanism, tumblers adapted for actuating the setting mechanism, means for returning the tumblers, gates adapted for holding the tumblers in storage, means for yieldingly tensioning said gates to holding position, means operable by returning tumblers for opening the gates, and latches adapted for movement to position for holding the gates open when the latter are rocked by returning tumblers.

59. In a telegraph transmitter, character and driving mechanism, setting mechanism, tumblers adapted for actuating the setting mechanism, means for returning the tumblers, gates adapted for holding the tumblers in storage, means for yieldingly tensioning said gates to holding position, means operable by returning tumblers for opening the gates, latches adapted for movement to position for holding the gates open when the latter are rocked by returning tumblers, and means for limiting the opening movement of the gates.

60. In a telegraph transmitter, character and driving mechanism, setting mechanism, tumblers adapted for actuating the setting mechanism, means for returning the tumblers, gates adapted for holding the tumblers in storage, means for yieldingly tensioning said gates to holding position, means operable by returning tumblers for opening the gates, latches adapted for movement to position for holding the gates open when the latter are rocked by returning tumblers, and a bar on each of said gates adapted for engaging the next gate in order to limit the opening movement of the barred gate.

61. In a telegraph transmitter, character and setting mechanism, tumblers adapted for coöperation with the setting mechanism, means for returning the tumblers, gates adapted for holding the tumblers in storage, means for yieldingly tensioning the gates to holding position, means operable by returning tumblers for rocking said gates to open position, latches adapted for automatic movement into holding relation with the open gates, and means for maintaining holding freedom of a gate when a succeeding gate has a tumbler in storage.

62. In a telegraph transmitter, character and setting mechanism, tumblers adapted for coöperation with the setting mechanism, means for returning the tumblers, gates for holding the tumblers in storage, springs for yieldingly tensioning said gates toward holding position, tappets on said gates adapted for engagement by returning tumblers, springs connecting the tappets with the gates, said tappet springs being stiffer than the gate springs whereby the gates are locked against the tension of the gate springs when the tappets are engaged by returning tumblers.

63. In a telegraph transmitter, character and setting mechanism, tumblers and pilot tumblers adapted for coöperation with the setting mechanism, separate tumbler and pilot guides, means for simultaneously releasing a tumbler and a pilot tumbler to their respective guides, gates adapted for holding the tumbler and pilot tumblers in storage, means for yieldingly tensioning each gate toward holding position, means for returning the tumbler and pilot tumbler, means operable by the returning tumblers to open the gates, latches adapted for holding the gates open against the tension of their yielding means, and means for pushing a pilot tumbler against the latch to release a succeeding gate with each actuation of the setting mechanism.

64. In a telegraph transmitter, character and setting mechanism, tumblers and pilot tumblers adapted for coöperation with the setting mechanism, separate tumbler and pilot tumbler guides, gates for holding the tumblers and pilot tumblers in storage and adapted for automatic movement to holding position, latches for holding the gates open, pins on said latches projecting into the pilot tumbler guide, a shoe adapted for actuation with each actuation of the setting mechanism and for pushing the pilot tumbler against the latch pins, means for returning the tumblers and pilot tumblers and means for opening said gates.

65. In a telegraph transmitter, character and setting mechanism, the latter comprising a pivoted member and a feeder, tumbler balls adapted for travel between the pivoted member and feeder to rock said member, and a stop member operable by the pivoted member to obstruct the travel of succeeding balls.

66. In a telegraph transmitter, character members and a setting device, the latter comprising a pivoted member and feeder, tumbler balls adapted for travel between the pivoted member and feeder to rock the former, a stop bar adapted for projection into the path of on-coming balls, and means on the stop bar for engagement by the pivoted member, for the purpose set forth.

67. In a telegraph transmitter, character and setting mechanism, the latter comprising a pivoted member having a shoe, a feeder revolubly mounted over the shoe, tumblers adapted for interposition between the shoe and feeder, a pivoted frame having a stop bar adapted for projection into the path of on-coming tumblers, and a bar on said frame adapted for engagement by the shoe on said pivoted member to rock the frame, for the purpose set forth.

68. In a telegraph transmitter, character and setting mechanism, the latter comprising a plurality of pivoted members, each having a shoe, a feeder, tumblers adapted for travel between the feeder and pivoted member shoes, a pivoted frame having a stop bar adapted for projection into the path of on-coming tumblers, and a bar on said frame under-hanging all of the pivoted member shoes, for the purpose set forth.

69. In a telegraph transmitter, character members, tumblers for actuating said character members, key levers for releasing said tumblers to functional position, and means for locking said key levers when a predetermined number of tumblers have been assembled in functional position.

70. A telegraph transmitter comprising character members, a single driving pinion, a pivotally mounted lever for each character member having a gear wheel constantly meshing with the pinion and adapted for meshing with the character member, an arm on said lever for holding said character member in initial position, means for yieldingly retaining said gear wheel out of and said arm into operative relation with said character member, a setting lever connected with the first lever and having a shoe, a cylinder revolubly mounted adjacent the shoe, tumblers adapted for travel between the cylinder and shoe to actuate the shoe, and means for assembling said tumblers prior to passage between the cylinder and shoe.

71. A telegraph transmitter comprising character members, an elongated driving pinion, a lever for each character member having a gear wheel constantly meshing with the elongated pinion and adapted to mesh with said character member, an arm on said lever for holding said character member in initial position, a spring for yieldingly holding said gear wheel out of and said arm into operative engagement with said character member, a setting lever connected with said first named lever and having a shoe, a curved track adjacent one side of and lying slightly below said shoe, an inclined track adjacent the opposite side of said shoe, a notched cylinder revolubly mounted above said curved track and in close proximity to said shoe, tumblers adapted for travel down said inclined track, means for selectively accumulating tumblers in said inclined track, and means for successively releasing said tumblers from said inclined track and between said cylinder and shoe.

72. A telegraph transmitter comprising character members, an elongated pinion, a lever for each character member having an arm for holding said character member in initial position and having a gear wheel meshing with said elongated pinion and adapted to mesh with said character member, a spring for holding said arm into and said gear wheel out of contact with said character member, a circuit closer adapted for actuation by said character member, a setting cylinder, a setting lever connected with said first lever and having a shoe located adjacent said cylinder, an inclined track adjacent said shoe, tumblers adapted for travel in said track, key levers for assembling tumblers in said track, and means for automatically releasing said tumblers from said track between said setting cylinder and shoe to throw said character member into operative position and actuate said circuit closer.

73. A telegraph transmitter comprising a plurality of individually operative character members, means for driving said character members, a control mechanism for said driving means, tumblers for tripping said control mechanism, and means for feeding said tumblers into said control mechanism.

74. A telegraph transmitter comprising a plurality of individually operative character members, means for driving said character members, a control mechanism for said driving means, tumblers for tripping said control mechanism, key levers for assembling said tumblers prior to tripping said control mechanism, and means for successively feeding said tumblers into said control mechanism.

75. A telegraph transmitter comprising a plurality of individually operative character members, means for driving said character members, a control mechanism for said driving means, tumblers for tripping said control mechanism, key levers for assembling said tumblers prior to tripping said control mechanism, means for feeding said tumblers into said control mechanism, and means automatically operable from the control mechanism, for forwarding said tumblers to feeding position.

76. In a telegraph transmitter, a plurality of character members, a driving device for each character member, a tumbler chute, tumblers adapted for travel in said chute, means for holding tumblers singly in said chute, a setting mechanism for said driving means, a normally raised bar extending across the base of said chute, and means carried by the setting mechanism for lowering said bar to hold a succeeding tumbler during the operation of the character member.

77. In a telegraph transmitter, a plurality of character members, a driving device for each character member, a control mechanism for said driving devices, a chute adjacent said control mechanism, tumblers for tripping said control mechanism and adapted for travel in said chute, means for holding tumblers singly in spaced relation in said chute, a bar extending across the base of said chute, key levers for assembling tumblers in said chute, means connected with the control mechanism for lowering said bar to hold a succeeding tumbler during the operation of the character member, and means controlled by said bar for successively moving the tumblers accumulated in said chute one space.

78. In a telegraph transmitter, a plurality of character members, a driving device for each character member, a setting cylinder, a lever for setting each character member having a shoe located adjacent the setting cylinder, an inclined chute located adjacent the shoes, tumblers adapted for travel in said chute, gates for holding a plurality of single tumblers in said chute, a normally raised bar extending across the base of said chute for feeding the first of said tumblers between said setting cylinder and shoe to actuate the character member, means on the character member for computing the duration of operation, means connected with said shoe for lowering said bar during actuation of the character member, and means operable from the bar for successively raising said gates to forward said tumblers.

79. In a telegraph transmitter, individually operative character members, a circuit breaker, an actuating device for each character member, a setting device for said character members, a control mechanism for setting said devices, tumblers for tripping the control mechanism, a tumbler chute, gates for holding tumblers to the chute, a conduit for returning tumblers after travel through the chute, a branch conduit leading from said return conduit and having a base slot, tappets on said gates projecting into said slot, means operable from the control device for shifting a tumbler from the return conduit into the branch conduit, and a screw in said branch conduit for forcing said tumbler past said tappets to successively raise said gates.

80. In a telegraph transmitter, character and setting mechanism, the latter comprising a plurality of pivoted members each having a shoe, a feeder, tumblers adapted for travel between the feeder and pivoted member shoes, a pivoted frame having a stop bar adapted for projection into the path of oncoming tumblers, a bar on said frame underlying all of the pivoted member shoes, means for accumulating tumblers in said feeder, a hopper for said feeder, means for returning spent tumblers to said hopper, means operable from said pivoted frame for removing a tumbler from said returning means, and means for utilizing tumblers thus removed for successively forwarding tumblers accumulated in said feeder.

81. In a telegraph transmitter, character members, setting mechanism for said character members, a prime mover, tumblers for tripping said setting mechanism to connect said character members with said prime mover, key levers for releasing said tumblers to tripping position, and means for simultaneously disconnecting said setting mechanism and connecting said character members directly to said key levers.

82. A telegraph transmitter comprising character members, means for actuating the character members, individual floating members for controlling said actuating means, and means operable from the character member for determining the active period thereof.

83. A telegraph transmitter comprising character members, means for actuating the character members, individual floating members for controlling said actuating means and means on the character member for disengaging the actuating means from the character member.

84. A telegraph transmitter comprising character members, clash gearing for actuating the character members, floating members for tripping said clash gearing into driving relation with said character members, and means on the character members disengaging said clash gearing when the character is finished.

85. In a telegraph transmitter comprising character members, means for actuating the character members, a hopper, individual floating members in said hopper, and means for releasing said floating members from the hopper for controlling the actuating means.

86. In a telegraph transmitter comprising character members, means for actuating the character members, a hopper, individual floating members in said hopper, means for releasing said floating members from the hopper for controlling the actuating means and means for returning said floating members to the hopper.

87. In a telegraph transmitter comprising character members, means for actuating the character members, individual floating members for controlling the actuating means, means for storing said floating members, and means for individually releasing said floating members from the storing means.

88. In a telegraph transmitter comprising character members, means for actuating the character members, individual floating members for controlling the actuating means, means for selectively storing said floating members and means for successively releasing said floating members in selected succession from said storing means.

89. In a telegraph transmitter comprising character members, means for actuating the character members, individual floating members for controlling the actuating means, a hopper for containing a plurality of said floating members, a storage chamber, means for selectively releasing said floating members to the storage chamber, means in the storage chamber for selectively separating said floating members, inter-locking mechanism for controlling the separating means and means for actuating the interlocking mechanism for successively releasing individual floating members to the character actuating means.

90. In a telegraph transmitter, unstable record media, means for directing said media to form a record, character mechanism, selectable by the record, and transmitter mechanism coöperating with said character mechanism.

91. In a telegraph transmitter, transmitter mechanism including a circuit making and breaking device and individually operable character members for actuating said device, storage mechanism, record media including individual members movable in a circuit including the storage mechanism, means effecting arrangement of said media in the storage mechanism to form a record, and means operable by said media in its order in storage to effect selective operation of the character members.

92. In a telegraph transmitter, transmitting mechanism including a circuit making and breaking device, and individually operable character members, a record storage element, a hopper at one end of the storage element, record media, means at the other end of the storage element controllable by said media to effect selective operation of character members according to arrangement of the media in the storage element, means for effecting distribution of the media from the hopper to the storage element to form a record, and means for returning said media to the hopper following selection of character members thereby.

93. In a telegraph transmitter, transmitting mechanism including a circuit making and breaking device and individually operable character members, media capable of recurrent use to form records by arrangement of the media, means for effecting arrangement of the media to form the records, and means operable by said media according to arrangement of the media in a record to effect selective operation of character members.

94. In a telegraph transmitter, character members, transmitting mechanism coöperative with said members, means including media, having neither individual characteristics nor fixed positions for forming a record whereby character members are selected, and means for directing said media to form the record.

95. In a telegraph transmitter, character members, storage mechanism, media coöperative with said storage mechanism for selecting character members, transmitting mechanism, means whereby media is drawn from the storage mechanism at a speed proportionate to the speed of transmission, to effect selection of character members, and a governor controlling speed of transmission.

96. In a telegraph transmitter, a fixed transmitter unit comprising individually movable character members, circuit controlling mechanism coöperative with said members, storage mechanism members movable through and from the storage mechanism in determined relation for effecting selection of character members, and means controlling movement of said selecting members.

97. In a telegraph transmitter, a fixed transmitter unit comprising individually movable character members, circuit controlling mechanism coöperative with said members, storage mechanism, members movable through and from the storage mechanism in determined relation for effecting selection of character members, and means controlling movement of said selecting members whereby the first member sent to storage is immediately conducted to coöperative relation with a character member.

98. In a telegraph transmitter, character members, a storage mechanism, means for withdrawing members from the storage mechanism, members adapted for advance through storage by stepped movements dependent upon withdrawal of successive members by said means, and means for effecting coöperation between the storage members and character members to effect selective operation of character members.

99. In a telegraph transmitter, storage mechanism, transmitter mechanism including character members, means movable through the storage mechanism and to the transmitter mechanism whereby character members are selected and flexible means bridging the space between the storage and transmitter mechanism and traversed by said selecting means for the purpose set forth.

100. In a telegraph transmitter, transmitting mechanism, including character members, a storage mechanism including stops, selecting members movable through the storage mechanism and coöperative with the transmitter mechanism to effect operation of selected character members and a single motor for effecting operation of the transmitter mechanism and storage stops, the selecting members being free to automatically advance in storage when the stops are actuated.

101. In a telegraph transmitter, transmitter mechanism, including character members, storage mechanism for retaining selecting members to form a record, selecting members coöperative with the transmitter mechanism to select character members, keyboard mechanism, means operable by the keyboard mechanism for controlling delivery of selecting members to storage and other means for connecting the keyboard mechanism with the transmitter mechanism, whereby selection of character members is effected directly from the keyboard mechanism.

102. In a telegraph transmitter, independently operable character members, a storage container, and members for controlling the character members, selectively movable into the container to produce storage and from the container to exhaust storage.

103. In a telegraph transmitter, a transmitter element, comprising individually operable character members, a storage element having record producing means, means for selectively charging said record producing means at random speeds, means for discharging said record producing means, to effect operation of character members, and means operable from the character members for timing the rate of discharge of the record producing means.

104. A telegraph transmitter comprising character members, clash gearing for actuating the character members, floating members for tripping said clash gearing into driving relation with said character members, and means of the character members for disengaging said clash gearing when the character is finished.

105. In a telegraph transmitter comprising character members, means for actuating the character members, a hopper, individual floating members adapted for collection in said hopper, and for effecting coöperation of said actuating means with a selected character member, means for releasing said floating members from the hopper and means for returning said floating members to the hopper.

106. In a telegraph transmitter, comprising character members, means for actuating the character members, individual floating members for controlling the actuating means, means for storing said floating members, and means for individually releasing said floating members from the storing means.

107. In a telegraph transmitter comprising character members, means for actuating the character members, individual floating members for controlling the actuating means, means for selectively storing said floating members and means for releasing said floating members in selected succession from said storing means.

108. In a telegraph transmitter comprising character members, means for actuating the character members, individual floating members for controlling the actuating means, a hopper for containing a plurality of said floating members, a storage chamber, means for selectively releasing said floating members to the storage chamber, means in the storage chamber for selectively separating said floating members, interlocking mechanism for controlling the separating means and means for actuating the interlocking mechanism for successively releasing individual floating members to the character actuating means.

In testimony whereof I affix my signature.

EDWIN H. PIERSEN.